United States Patent
Huang et al.

(10) Patent No.: US 11,196,589 B2
(45) Date of Patent: Dec. 7, 2021

(54) FORWARDING ENTRY GENERATION

(71) Applicant: NEW H3C TECHNOLOGIES CO., LTD., Hangzhou (CN)

(72) Inventors: Liwei Huang, Beijing (CN); Wei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 60 days.

(21) Appl. No.: 16/620,447

(22) PCT Filed: Jun. 19, 2018

(86) PCT No.: PCT/CN2018/091771
§ 371 (c)(1),
(2) Date: Dec. 6, 2019

(87) PCT Pub. No.: WO2018/233588
PCT Pub. Date: Dec. 27, 2018

(65) Prior Publication Data
US 2020/0366524 A1    Nov. 19, 2020

(30) Foreign Application Priority Data
Jun. 23, 2017   (CN) .......................... 201710484398.4

(51) Int. Cl.
*H04L 12/703*   (2013.01)
*H04L 12/46*    (2006.01)
(Continued)

(52) U.S. Cl.
CPC ...... *H04L 12/4633* (2013.01); *H04L 12/4641* (2013.01); *H04L 45/28* (2013.01); *H04L 45/74* (2013.01); *H04L 61/103* (2013.01)

(58) Field of Classification Search
CPC ............. H01L 12/4633; H01L 12/4641; H01L 12/462; H01L 29/06612; H01L 45/00;
(Continued)

(56) References Cited

U.S. PATENT DOCUMENTS

2014/0369186 A1* 12/2014 Ernstrom .............. H04L 45/586
                                                        370/228
2015/0124586 A1    5/2015 Pani
(Continued)

FOREIGN PATENT DOCUMENTS

CN          102238092        11/2011
CN          106161248        11/2016
(Continued)

OTHER PUBLICATIONS

Boutros, Sami et al., "VXLAN DCI Using EVPN; draft-boutros-bess-vxlan-evpn-02.txt" Internet Engineering Task Force, Internet Society, 16 pages [retrieved on Oct. 21, 2016].
Extended European Search Report issued in corresponding European Application No. 18819872.5, dated Mar. 10, 2020.
International Search Report and Written Opinion issued in corresponding PCT Application No. PCT/CN2018/091771, dated Sep. 7, 2018 (English translation of International Search Report provided).

*Primary Examiner* — Mansour Oveissi
(74) *Attorney, Agent, or Firm* — Norton Rose Fulbright US LLP

(57) ABSTRACT

Provided are a method and an apparatus for generating a forwarding entry and a machine-readable storage medium, which are applied to a distributed resilient network interconnect (DR) network comprising a remote device and a DR device. The remote device is connected with the DR device. The DR device includes first DR member device and at least one second DR member device, each of which is connected with a host via an aggregation port. In an example of the method, when receiving first synchronous message carrying address information of the host from the first DR member device and the first synchronous message carries an identifier of the aggregation port, the remote device determines
(Continued)

that the remote device connects the DR device via at least two tunnels of the aggregation port according to the identifier, and generates a forwarding entry corresponding to the host according to information of each of the tunnels.

12 Claims, 4 Drawing Sheets

(51) Int. Cl.
*H04L 12/741* (2013.01)
*H04L 29/12* (2006.01)

(58) Field of Classification Search
CPC ......... H01L 49/00; H01L 45/28; H01L 45/74; H01L 61/103
See application file for complete search history.

(56) References Cited

U.S. PATENT DOCUMENTS

| | | | |
|---|---|---|---|
| 2015/0334011 A1* | 11/2015 | Zheng | H04L 49/3009 370/254 |
| 2016/0072669 A1 | 3/2016 | Saavedra | |
| 2016/0330046 A1 | 11/2016 | Yang et al. | |
| 2017/0026417 A1 | 1/2017 | Ermagan et al. | |

FOREIGN PATENT DOCUMENTS

| | | |
|---|---|---|
| CN | 106878047 | 6/2017 |
| CN | 106878048 | 6/2017 |
| CN | 106878065 | 6/2017 |
| CN | 106878164 | 6/2017 |
| CN | 106878166 | 6/2017 |
| CN | 106878183 | 6/2017 |

* cited by examiner

FORWARDING ENTRY GENERATION

CROSS REFERENCE TO RELATED APPLICATIONS

This application is a national phase under 35 U.S.C. § 371 of International Application No. PCT/CN2018/091771, filed Jun. 19, 2018, which claims priority to Chinese Patent Application No. 201710484398.4 entitled "METHOD AND APPARATUS FOR GENERATING FORWARDING ENTRY AND MACHINE-READABLE STORAGE MEDIUM" filed on Jun. 23, 2017, the entire contents of each of which are incorporated herein by reference in their entirety.

BACKGROUND

Virtual eXtensible Local Area Network (VXLAN) is a layer-2 Virtual Private Network (VPN) technology which is based on an IP network and employs an MAC-in-UDP (Media Access Control (MAC) in User Datagram Protocol (UDP)) encapsulation manner. VXLAN may provide layer-2 interconnection to dispersed sites based on existing Internet Protocol (IP) networks of service providers or enterprises, and can also provide service isolation to different tenants.

BRIEF DESCRIPTION OF THE DRAWINGS

To describe the technical solutions in the examples of the present disclosure or in the prior art more clearly, the accompanying drawings required to describe the examples of the present disclosure or the prior art will be briefly introduced below. Apparently, the accompanying drawings described below are only some examples of the present disclosure, and those of ordinary skill in the art may obtain other accompanying drawings according to the accompanying drawings in examples of the present disclosure.

DETAILED DESCRIPTION OF THE EMBODIMENTS

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Figure 1:
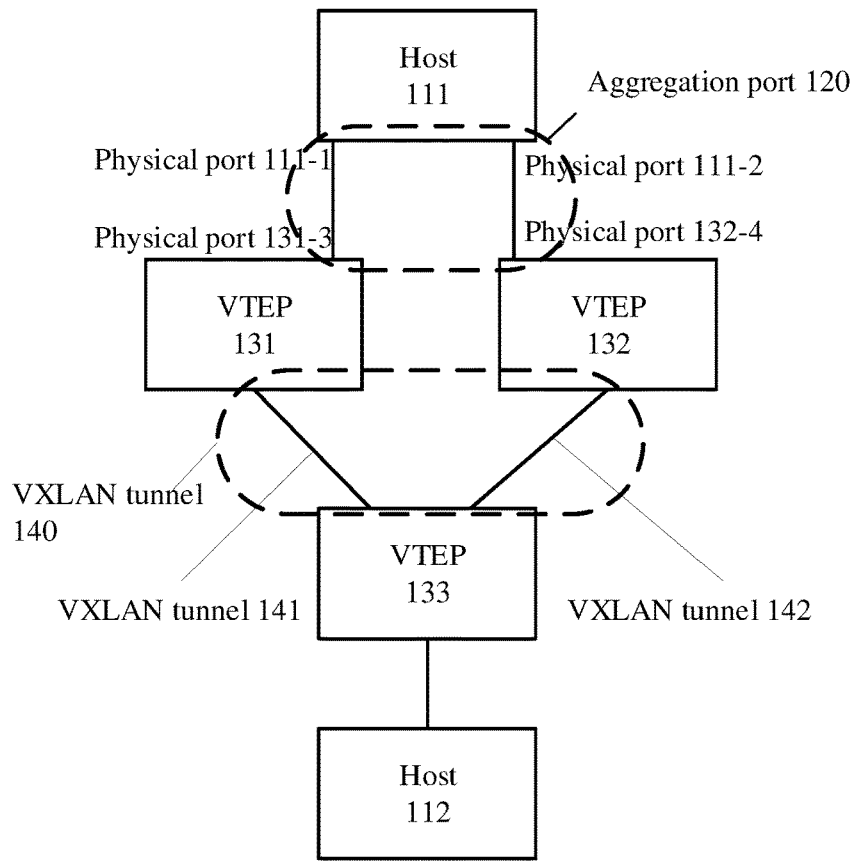
FIG. 1 is a schematic diagram illustrating a distributed resilient network interconnect VXLAN network.

To improve reliability, a distributed resilient network interconnect VXLAN networking manner may be adopted. As shown in FIG. 1, a physical port 111-1 and a physical port 111-2 of a host 111 join an aggregation port 120. A physical port 131-3 of a VXLAN Tunnel End Point (VTEP) 131 and a physical port 132-4 of the VTEP 132 may join the aggregation port 120 based on a distributed resilient network interconnect protocol. In this way, a packet sent from the host 111 to a host 112 may be sent via the physical port 111-1 or the physical port 111-2. The VTEP 131 or the VTEP 132 may forward the packet after receiving the packet. Moreover, the host 111 still can send the packet to the host 112 when one of the VTEP 131 and the VTEP 132 fails, thus improving reliability.

In the above application scenario, an aggregation address shared by the VTEP 131 and the VTEP 132 may be configured on the VTEP 131 and the VTEP 132. Thus, by establishing a VXLAN tunnel corresponding to the aggregation address, a VTEP 133 can be connected to the VTEP 131 and the VTEP 132 via the VXLAN tunnel. In this case, since both VTEP 131 and VTEP 132 are used as a next hop corresponding to the VXLAN tunnel, the VXLAN tunnel can work normally when the VTEP 131 or the VTEP 132 fails. Therefore, it cannot be detected whether the VTEP 131 or the VTEP 132 fails timely, resulted in that the network cannot be repaired in time.

The present disclosure provides a method of generating a forwarding entry which may be applied to a system including a Distributed Resilient Network Interconnect (DR) device and a remote device, where the DR device is connected with the remote device and may include at least two DR member devices, for example, a first DR member device and a second DR member device. The first DR member device and the second DR member device are both connected with a host via an aggregation port, that is, physical ports of the first DR member device and the second DR member device constitute an aggregation port associated with the host.

In the distributed resilient network interconnect network shown in FIG. 1, the physical ports 111-1 and 111-2 of the host 111 join the aggregation port 120, and the physical port 131-3 of the VTEP 131 and the physical port 132-4 of the VTEP 132 also join the aggregation port 120 based on a distributed resilient network interconnect protocol. Based on this, the VTEP 131 serves as a DR member device, the VTEP 132 serves as another DR member device, and the DR member devices VTEP 131 and VTEP 132 constitute a DR device. Moreover, the VTEP 133 serving as a remote device is connected with both the DR member devices VTEP 131 and VTEP 132.

Figure 2:
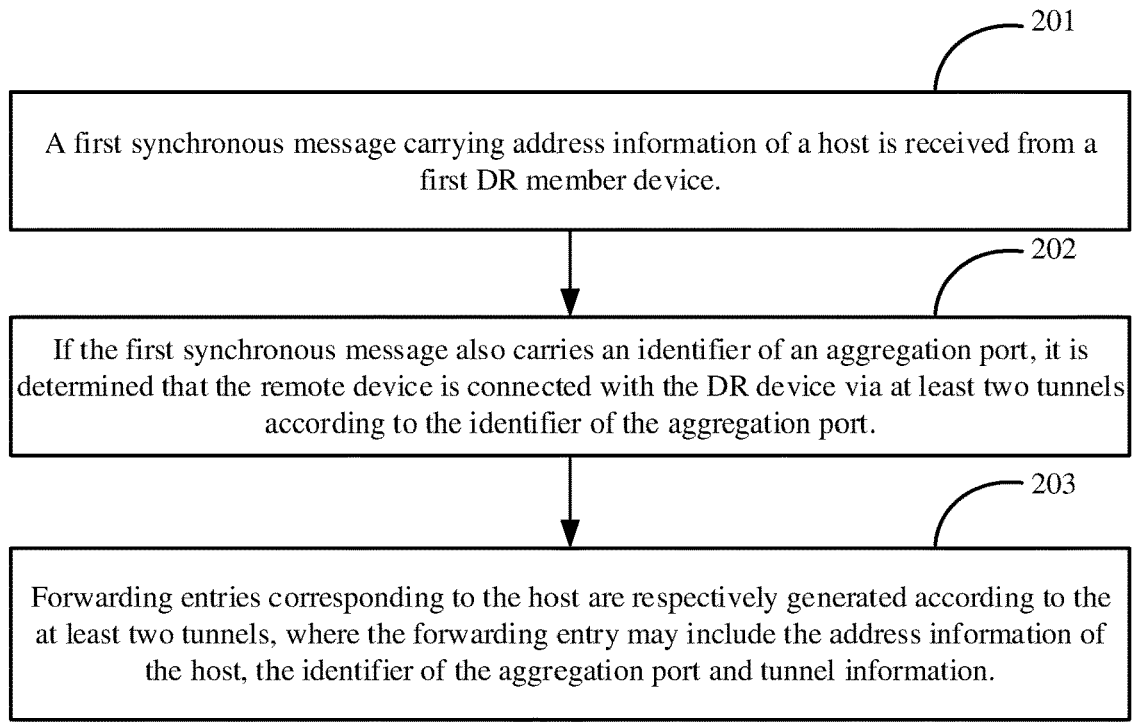
FIG. 2 is a flowchart illustrating a method of generating a forwarding entry according to an example of the present disclosure.

As shown in FIG. 2, the method of generating a forwarding entry may be applied to a remote device in a distributed resilient network interconnect network and may include the following blocks:

At block 201, a first synchronous message carrying address information of a host is received from a first DR member device, where the first DR member device may be any DR member device included in a DR device.

In an example, the first DR member device may generate the first synchronous message and send the first synchronous message to a remote device. A process that the first DR member device generates the first synchronous message may be divided into the following cases.

In a first case: the first DR member device may generate the first synchronous message according to an Address Resolution Protocol (ARP) packet received from the host and send the first synchronous message to the remote device, where the first synchronous message may carry the address information of the host and an identifier of an aggregation port.

The first DR member device may analyze the address information of the host, for example, an MAC address and/or an IP address of the host, from the ARP packet received from the host, and the first synchronous message may carry the address information of the host.

If the first DR member device receives the ARP packet from the host via the aggregation port, the first synchronous message may further carry the identifier of the aggregation port. Further, if the first DR member device receives the ARP packet from the host via a non-aggregation port, the first synchronous message may not carry an aggregation port identifier.

Taking a case that the first DR member device receives the ARP packet from the host via the aggregation port as an example, the first synchronous message may carry at least the address information of the host and the identifier of the aggregation port. Certainly, the first synchronous message may further carry other content which is not limited herein.

The first synchronous message may be a Multi Protocol-Border Gateway Protocol (MP-BGP) message. A distributed resilient network interconnect system may be applied to an Ethernet Virtual Private Network (EVPN). The EVPN is a layer-2 VPN technology, where a control plane may advertise Route information based on a MP-BGP and a data plane may forward a packet in a VXLAN encapsulation manner. Therefore, the first synchronous message for advertising the route information may be an MP-BGP message.

On this basis, in an example, the address information is an MAC address, and the content carried in the first synchronous message may include: MSG type (message type) "EVPN MAC"; an MAC address "A-A-A" of a host; a VXLAN identifier "10001"; an aggregation port identifier "120", a Route Target (RT) "1:1" and a Route Distinguisher (RD) "1:1", where the MSG type "EVPN MAC" represents that a current message is used for synchronizing an MAC address. Apparently, the foregoing numerical values are merely an example of the present disclosure, which are not limited herein.

In an example, after receiving the ARP packet from the host, the first DR member device may further locally generate a forwarding entry corresponding to the host. The forwarding entry may include a corresponding relationship between the address information of the host and the identifier of the aggregation port. Certainly, the forwarding entry may further include other content, for example, a network identifier. Moreover, the network identifier may include a VXLAN identifier and/or a VLAN identifier. Table 1 shows an example of a forwarding entry including a VXLAN identifier.

TABLE 1

| MAC address | Aggregation port | VXLAN identifier |
|---|---|---|
| A-A-A | 120 | 10001 |

Further, the first DR member device may also send an inter-member synchronous message to the second DR member device. The inter-member synchronous message may carry the address information of the host, the identifier of the aggregation port and a VXLAN identifier. Alternatively, the inter-member synchronous message may carry the address information of the host, the identifier of the aggregation port, a VXLAN identifier and a VLAN identifier.

In an example, a link between the first DR member device and the second DR member device may include but not limited to an Intra-Portal Link (IPL). The first DR member device may send the inter-member synchronous message to the second DR member device via the IPL.

The inter-member synchronous message may include but not limited to an MP-BGP message. For example, the inter-member synchronous message may carry the MAC address "A-A-A" of the host, the aggregation port identifier "120" and the VXLAN identifier "10001". Alternatively, the inter-member synchronous message may carry the MAC address "A-A-A" of the host, the aggregation port identifier "120", the VXLAN identifier "10001" and the VLAN identifier "100". Certainly, the inter-member synchronous message may further include other content, for example, an MSG type "Multi-chassis Link Aggregation (MLAG) MAC ADD". The MSG type represents that the current message is used for synchronizing the MAC address.

In a second case: after receiving an inter-member synchronous message from the second DR member device, the first DR member device may generate a first synchronous message corresponding to the inter-member synchronous message and send the first synchronous message to the remote device.

The first DR member device may analyze the address information of the host (e.g. an MAC address and/or an IP address of the host) from the inter-member synchronous message, and the first synchronous message may carry the address information of the host. The first DR member device may further analyze the identifier of the aggregation port from the inter-member synchronous message, and the first synchronous message may carry the identifier of the aggregation port. Certainly, the first synchronous message may further carry other content.

The first synchronous message may be an MP-BGP message. In an example, the address information is an MAC address, and content carried in the first synchronous message may include: the MSG type "EVPN MAC", the MAC address "A-A-A" of the host, the VXLAN identifier "10001", the aggregation port identifier "120", the RT "1:1" and the RD "1:1". Apparently, the foregoing numerical values are merely an example, which are not limited herein.

In an example, after receiving the inter-member synchronous message from the second DR member device, the first DR member device may further locally generate a forwarding entry according to the address information of the host, the identifier of the aggregation port and the network identifier that are analyzed from the inter-member synchronous message. Thus, the forwarding entry may include a corresponding relationship among the address information of the host, the identifier of the aggregation port and the network identifier.

Alternatively, the first DR member device may locally generate a forwarding entry according to the address information of the host, the identifier of the aggregation port, the VXLAN identifier and the VLAN identifier that are analyzed from the inter-member synchronous message. Thus, the forwarding entry may include a corresponding relationship among the address information of the host, the identifier of the aggregation port, the VXLAN identifier and the VLAN identifier. Certainly, the forwarding entry may further include other content. Table 2 shows an example of a forwarding entry including a VXLAN identifier, and Table 3 shows an example of a forwarding entry including a VXLAN identifier and a VLAN identifier.

TABLE 2

| MAC address | Aggregation port | VXLAN identifier |
| --- | --- | --- |
| A-A-A | 120 | 10001 |

TABLE 3

| MAC address | Aggregation port | VXLAN identifier | VLAN identifier |
| --- | --- | --- | --- |
| A-A-A | 120 | 10001 | 100 |

The foregoing process of the present disclosure will be further described below in combination with the application scenario shown in FIG. 1.

The physical ports 111-1 and 111-2 of the host 111 join the aggregation port 120, and the physical port 131-3 of the VTEP 131 serving as the first DR member device and the physical port 132-4 of the VTEP 132 serving as the second DR member device also join the aggregation port 120. When the host 111 goes online, an ARP packet, for example, a free ARP packet or an ARP request packet, may be sent via the physical port 111-1 or the physical port 111-2. In an example, if an ARP packet is sent via the physical port 111-1, after receiving the ARP packet, the VTEP 131 may analyze address information of the host 111 (for example, an MAC address and/or an IP address of the host 111), an aggregation port identifier "aggregation port 120" and a VXLAN identifier "10001" from the ARP packet, and generate a forwarding entry. In an example, the address information of the host 111 is an MAC address, and the forwarding entry is used to record a corresponding relationship among the MAC address "A-A-A", the aggregation port identifier "120" and the VXLAN identifier "10001".

Then, the VTEP 131 may further send an inter-member synchronous message to the VTEP 132 via an IPL, where the inter-member synchronous message may carry the MAC address "A-A-A", the aggregation port identifier "120" and the VXLAN identifier "10001". Alternatively, the inter-member synchronous message may also carry the MAC address "A-A-A", the aggregation port identifier "120", the VXLAN identifier "10001" and the VLAN identifier "100". In addition, the VTEP 131 may further send the first synchronous message to the VTEP 133 serving as a remote device, where the first synchronous message may carry the MAC address "A-A-A", the aggregation port identifier "120" and the VXLAN identifier "10001".

In an example, after receiving the inter-member synchronous message via the IPL, the VTEP 132 may analyze the MAC address "A-A-A", the aggregation port identifier "120" and the VXLAN identifier "10001" from the inter-member synchronous message, and then locally generate a forwarding entry. The forwarding entry is used to record a corresponding relationship among the MAC address "A-A-A", the aggregation port identifier "120" and the VXLAN identifier "10001". Alternatively, the VTEP 132 may analyze the MAC address "A-A-A", the aggregation port identifier "120", the VXLAN identifier "10001" and the VLAN identifier "100" from the inter-member synchronous message, and then generate a forwarding entry. The forwarding entry is used to record a corresponding relationship among the MAC address "A-A-A", the aggregation port identifier "120", the VXLAN identifier "10001" and the VLAN identifier "100".

Further, the VTEP 132 serving as the second DR member device may further send a second synchronous message to the VTEP 133 serving as the remote device, where the second synchronous message may carry the MAC address "A-A-A", the aggregation port identifier "120" and the VXLAN identifier "10001".

A flow after the VTEP 133 serving as the remote device receives the first synchronous message from the VTEP 131 serving as the first DR member device and the second synchronous message from the VTEP 132 serving as the second DR member device will be described in the subsequent process of the examples of the present disclosure and is not described here redundantly.

In an example, the inter-member synchronous message sent from the VTEP 131 to the VTEP 132 may carry only the VXLAN identifier "10001" and not carry the VLAN identifier "100". In this way, each of the forwarding entries respectively generated by the VTEP 131 and the VTEP 132 includes only the VXLAN identifier "10001" and does not include the VLAN identifier "100". Alternatively, the inter-member synchronous message sent from the VTEP 131 to the VTEP 132 may carry the VXLAN identifier "10001" and the VLAN identifier "100". Thus, each of the forwarding entries respectively generated by the VTEP 131 and the VTEP 132 includes the VXLAN identifier "10001" and the VLAN identifier "100".

If the VXLAN identifier "10001" rather than a corresponding relationship between the VXLAN identifier "10001" and the VLAN identifier "100" is configured on the VTEP 131/VTEP 132, the inter-member synchronous message sent from the VTEP 131 to the VTEP 132 carries the VXLAN identifier "10001", and each of the forwarding entries respectively generated by the VTEP 131 and the VTEP 132 includes only the VXLAN identifier "10001". In this case, the host 111 may access a network using any VLAN identifier. As a result, more application scenarios can be achieved due to no limitations to the VLAN identifier used by the host 111.

If the corresponding relationship between the VXLAN identifier "10001" and the VLAN identifier "100" is configured on the VTEP 131/VTEP 132, the inter-member synchronous message sent from the VTEP 131 to the VTEP 132 carries the VXLAN identifier "10001" and the VLAN identifier "100", and each of the forwarding entries respectively generated by the VTEP 131 and the VTEP 132 includes the VXLAN identifier "10001" and the VLAN identifier "100". In this case, the host 111 can access a network only using the VLAN identifier "100". As a result, the host 111 cannot access a network using another VLAN identifier because the VLAN identifier used by the host 111 is limited.

At block 202, if the first synchronous message also carries an identifier of an aggregation port, it is determined that the remote device is connected with the DR device via at least two tunnels according to the identifier of the aggregation port.

In an example, after the remote device receives the first synchronous message, if the first synchronous message further carries the identifier of the aggregation port, it can be determined that the remote device is connected with at least two DR member devices of a DR device, that is, the remote device may be connected with the DR device via at least two tunnels. For example, the remote device may be connected with the first DR member device in the DR device via a first tunnel and with the second DR member device in the DR device via a second tunnel.

At block 203, forwarding entries corresponding to the host are respectively generated according to the at least two tunnels, where the forwarding entry may include the address information of the host, the identifier of the aggregation port and tunnel information. For example, the remote device may generate a first forwarding entry corresponding to the host according to the first tunnel and generate a second forwarding entry corresponding to the host according to the second tunnel. The first forwarding entry may include the address information of the host, the identifier of the aggregation port and information of the first tunnel, and the second forwarding entry may include the address information of the host, the identifier of the aggregation port and information of the second tunnel.

When a forwarding entry corresponding to the host is generated according to each tunnel, it may be first determined whether a forwarding entry corresponding to the host is present in a forwarding table. If the forwarding entry corresponding to the host is not present in the forwarding table, a first forwarding entry may be added to the forwarding table, where the first forwarding entry records the first tunnel between the remote device and the first DR member device. If the forwarding entry corresponding to the host is present in the forwarding table and the forwarding entry corresponding to the host records the second tunnel between the remote device and the second DR member device, a first forwarding entry may be added to the forwarding table because the first synchronous message carries the identifier of the aggregation port. Also, the added first forwarding entry records the first tunnel between the remote device and the first DR member device and further includes the address information of the host and the identifier of the aggregation port.

For example, as shown in FIG. 1, a VXLAN tunnel 141 is established between the VTEP 133 and the VTEP 131, and addresses of two ends of the VXLAN tunnel 141 are an address of the VTEP 133 (for example, an IP address of the VTEP 133) and an address of the VTEP 131 (for example, an IP address of the VTEP 131), respectively. In addition, a VXLAN tunnel 142 is established between the VTEP 133 and the VTEP 132, and addresses of two ends of the VXLAN tunnel 142 are an address of the VTEP 133 (for example, an IP address of the VTEP 133) and an address of the VTEP 132 (for example, an IP address of the VTEP 132), respectively.

On this basis, after receiving the first synchronous message from the VTEP 131, the VTEP 133 may analyze the MAC address "A-A-A" of the host 111 and the aggregation port identifier "120" from the first synchronous message and obtain information of the VXLAN tunnel 141 between the VTEP 133 and the VTEP 131. Because there is no forwarding entry corresponding to the MAC address "A-A-A" in the forwarding table, the VTEP 133 may generate a forwarding entry including the MAC address "A-A-A", the aggregation port identifier "120" and the information of the VXLAN tunnel 141.

Similarly, after receiving the second synchronous message from the VTEP 132, the VTEP 133 may analyze the MAC address "A-A-A" of the host and the aggregation port identifier "120" from the second synchronous message and obtain information of the VXLAN tunnel 142 between the VTEP 133 and the VTEP 132. It is assumed that the VTEP 133 generates a forwarding entry corresponding to the host 111 according to the first synchronous message received from the VTEP 131 as described above. In this case, because a forwarding entry corresponding to the MAC address "A-A-A" is present in the forwarding table and the forwarding entry records the aggregation port identifier "120" and the information of the VXLAN tunnel 141 between the VTEP 131 and the VTEP 133, and also the second synchronous message from the VTEP 132 carries the aggregation port identifier "120" and the information of the VXLAN tunnel 142, the VTEP 133 may generate a forwarding entry including the MAC address "A-A-A", the aggregation port identifier "120" and the information of the VXLAN tunnel 142.

Certainly, the forwarding entry may further include other content, for example, a VXLAN identifier "10001" and the like.

Table 4 shows an example of a forwarding entry. It can be seen from Table 4 that in the case that a DR device associated with the host 111 includes two member devices, i.e. the VTEP 131 and the VTEP 132, the VTEP 133 may generate two forwarding entries corresponding to the MAC address "A-A-A" of the host 111. One of the forwarding entries includes the VXLAN tunnel 141 between the VTEP 133 and the VTEP 131, and the other includes the VXLAN tunnel 142 between the VTEP 133 and the VTEP 132. Thus, the VTEP 133 may perceive a failure of the VXLAN tunnel 141 when the VTEP 131 or the VXLAN tunnel 141 fails and perceive a failure of the VXLAN tunnel 142 when the VTEP 132 or the VXLAN tunnel 142 fails.

TABLE 4

| MAC address | Aggregation identifier port | VXLAN identifier | Egress interface |
| --- | --- | --- | --- |
| A-A-A | 120 | 10001 | VXLAN tunnel 141 |
| A-A-A | 120 | 10001 | VXLAN tunnel 142 |

In an example, after the remote device receives the first synchronous message from the first DR member device, if the first synchronous message carries no aggregation port identifier, the address information of the host may be analyzed from the first synchronous message, and information of a shared tunnel between the remote device and the DR device may also be obtained. An address of the shared tunnel at the DR device is an aggregation address of the DR device. Thus, the remote device may generate a shared forwarding entry corresponding to the host, where the shared forwarding entry may include a corresponding relationship between the address information of the host and the shared tunnel.

For example, the VTEP 133 may establish a VXLAN tunnel 140 with a DR device formed by the VTEP 131 and the VTEP 132. Moreover, a source address of the VXLAN tunnel 140 is an address of the VTEP 133, for example, an IP address of the VTEP 133, and an address of the VXLAN tunnel 140 at the DR device is an aggregation address, for example, an aggregation address shared by the VTEP 131 and the VTEP 132. On this basis, after receiving a synchronous message from the VTEP 131 or the VTEP 132, the VTEP 133 may analyze address information of a host associated with the DR device, for example, an MAC address "A-A-A" of the host 111, from the synchronous message, and obtain information of the VXLAN tunnel 140 between the VTEP 133 and the DR device.

Then, if a forwarding entry corresponding to the MAC address "A-A-A" and the VXLAN tunnel 140 already exists, no new forwarding entry is generated. If a forwarding entry corresponding to the MAC address "A-A-A" and the VXLAN tunnel 140 does not exist, a forwarding entry including the MAC address "A-A-A" and the VXLAN tunnel 140 is generated. Certainly, the forwarding entry may further include other content, for example, the VXLAN identifier "10001". Table 5 shows an example of a forwarding entry. It can be seen from Table 5 that DR member devices, i.e. the VTEP 131 and the VTEP 132 included in the DR device, share a forwarding entry. The forwarding entry includes the address information of the host associated with the DR device, the MAC address "A-A-A", the information of a tunnel between the DR device and the remote device, for example, the VXLAN tunnel 140.

TABLE 5

| MAC address | VXLAN identifier | Egress interface |
| --- | --- | --- |
| A-A-A | 10001 | VXLAN tunnel 140 |

Based on the above technical solution, it can be known that a remote device connected with a DR device may generate a corresponding forwarding entry for each of the DR member devices included in the DR device and the forwarding entry may include information of a tunnel (for example, VXLAN tunnel) between the remote device and the DR member device. In this way, each DR member device is equivalent to an independent device. When a particular DR member device fails, the remote device may detect a failure of a tunnel corresponding to the DR member device so that a network can be repaired timely.

Figure 3:
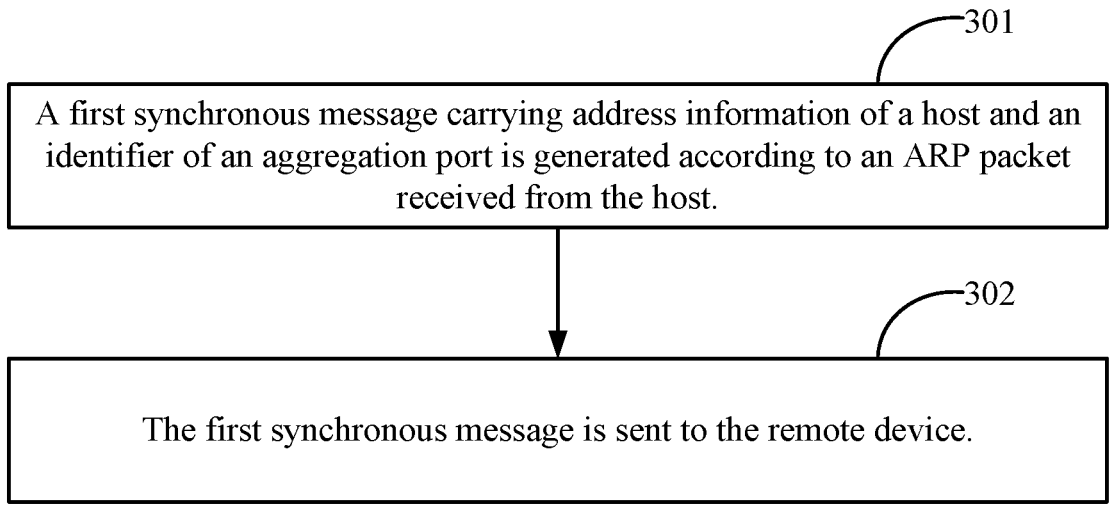
FIG. 3 is a flowchart illustrating a method of generating a forwarding entry according to another example of the present disclosure.

Based on a same technical idea as the foregoing disclosure, the present disclosure also provides another method of generating a forwarding entry, which may be applied to a first DR member device in a DR device in a distributed resilient network interconnect network. The DR device is connected with a remote device, and the first DR member device and a second DR member device included in the DR device are connected with a host via an aggregation port. FIG. 3 is a flowchart illustrating the method of generating a forwarding entry.

At block 301, a first synchronous message carrying address information of a host and an identifier of an aggregation port is generated according to an ARP packet received from the host. The address information of the host may include an IP address and/or an MAC address of the host.

At block 302, the first synchronous message is sent to the remote device. Thus, the remote device can determine that the remote device is connected with the DR device via at least two tunnels according to the identifier of the aggregation port and respectively generate a forwarding entry corresponding to the host according to each of the tunnels. A reference may be made to the flow shown in FIG. 2 for the processing of the remote device.

In an example, the first DR member device may further generate a forwarding entry corresponding to the host according to the ARP packet received from the host, where the forwarding entry includes the address information of the host and the identifier of the aggregation port.

Further, the first DR member device may also send an inter-member synchronous message to the second DR member device according to the ARP packet received from the host, where the inter-member synchronous message carries the address information of the host, the identifier of the aggregation port and a network identifier. The network identifier may include a VXLAN identifier and/or a VLAN identifier.

In an example, after receiving an inter-member synchronous message from the second DR member device, the first DR member device may analyze the address information of the host, the identifier of the aggregation port and the network identifier from the inter-member synchronous message and thereby generate a forwarding entry. The forwarding entry includes the address information of the host, the identifier of the aggregation port and the network identifier. The network identifier may include a VXLAN identifier and/or a VLAN identifier.

Figure 4:
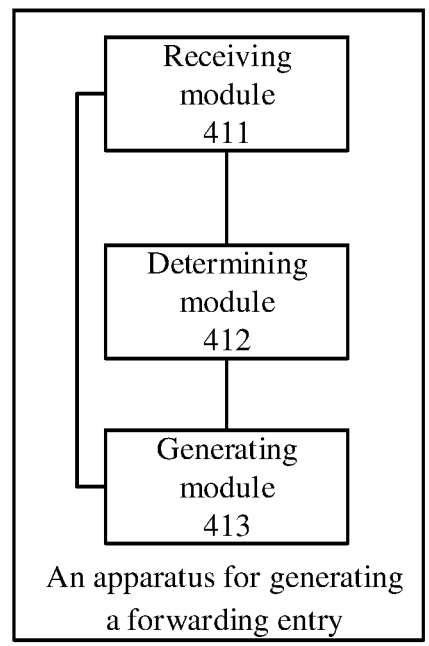
FIG. 4 is a schematic diagram illustrating a structure of an apparatus for generating a forwarding entry according to an example of the present disclosure.

Based on a same idea as the foregoing method, the present disclosure also provides an apparatus for generating a forwarding entry, which may be applied to a remote device. A DR device connected with the remote device includes a first DR member device and a second DR member device. The first DR member device and the second DR member device are connected with a host via an aggregation port. As shown in FIG. 4, the apparatus may include: a receiving module 411 configured to receive a first synchronous message from the first DR member device, where the first synchronous message carries address information of the host; a determining module 412 configured to determine that the remote device is connected with the DR device via at least two tunnels according to an identifier of the aggregation port, when the first synchronous message carries the identifier of the aggregation port; and a generating module 413 configured to generate a forwarding entry corresponding to the host according to each tunnel, where each of the forwarding entries includes the address information of the host, the identifier of the aggregation port and information of the tunnel.

According to an example, the generating module 413 is specifically configured to add a first forwarding entry to a forwarding table if a forwarding entry corresponding to the host does not exist in the forwarding table, where the first forwarding entry records a first tunnel between the remote device and the first DR member device; add a first forwarding entry to the forwarding table if a forwarding entry corresponding to the host exists in the forwarding table and the added first forwarding entry records a first tunnel between the remote device and the first DR member device.

According to another example, the generating module 413 is further configured to obtain information of a shared tunnel between the remote device and the DR device when the receiving module 11 receives the first synchronous message from the first DR member device and the first synchronous message carries no aggregation port identifier, where an address of the shared tunnel at the DR device is an aggregation address of the DR device. Then, the generating module 413 may generate a shared forwarding entry corresponding to the host, where the shared forwarding entry includes the address information of the host and information of the shared tunnel.

Figure 5:
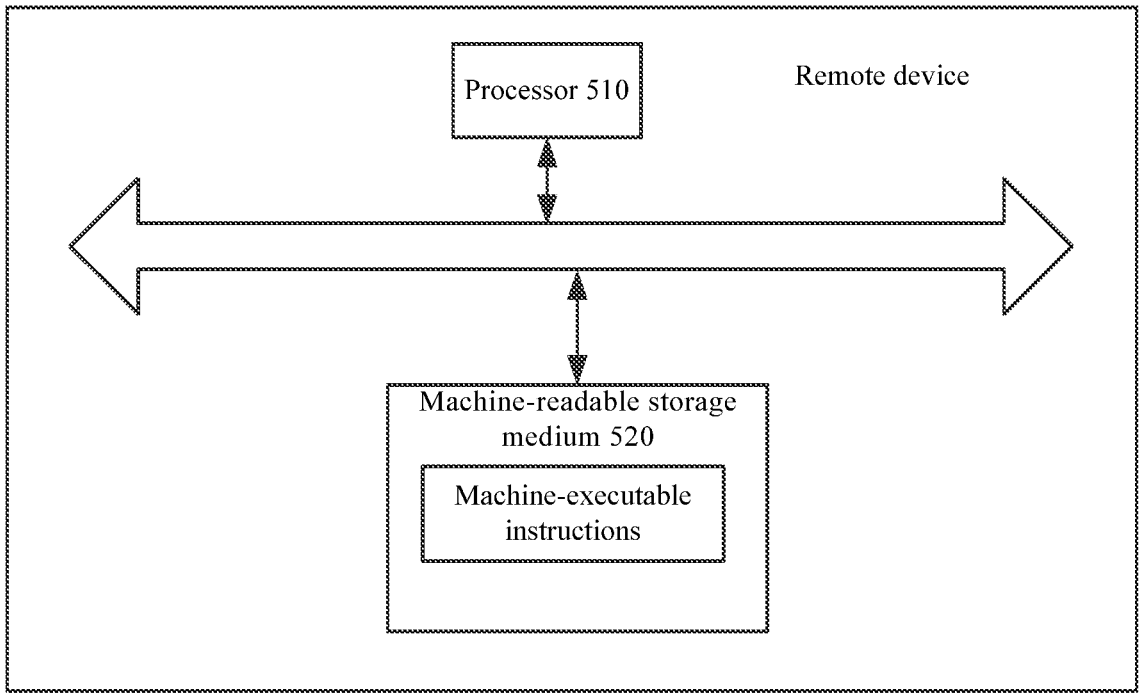
FIG. 5 is a schematic diagram illustrating a hardware structure of a remote device according to an example of the present disclosure.

Based on the hardware level, FIG. 5 illustrates a hardware structure of a remote device according to an example of the present disclosure. The hardware structure may include a machine-readable storage medium 520 and a processor 510. The machine-readable storage medium 520 stores machine-executable instructions. The processor 510 communicates with the machine-readable storage medium 520 so that the processor may execute the operations of generating a forwarding entry as above by reading and executing the machine-executable instructions stored in the machine-readable storage medium.

Here, the machine-readable storage medium may be any of electronic, magnetic, optical or other physical storage devices that can contain or store information such as executable instructions, data, and the like. For example, the machine-readable storage medium may be a volatile memory, a nonvolatile memory or a similar storage medium. Specifically, the machine-readable storage medium may be a Random Access Memory (RAM), a flash memory, a storage drive (e.g. hard disk drive), a solid state hard disk, any type of storage disk (e.g., optical disk, DVD and the like), or a combination thereof.

Figure 6:
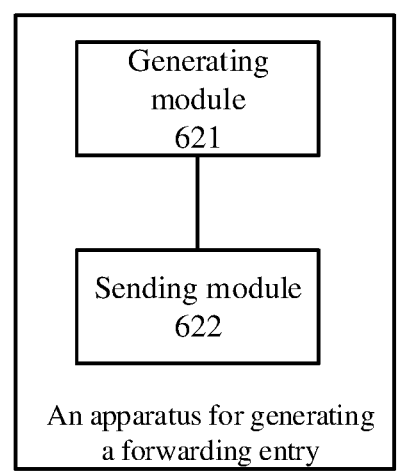
FIG. 6 is a schematic diagram illustrating a structure of an apparatus for generating a forwarding entry according to another example of the present disclosure.

Based on a same idea as the foregoing method, the present disclosure also provides another apparatus for generating a forwarding entry, which may be applied to a first DR member device in a DR device in a distributed resilient network interconnect network. The DR device is connected with a remote device, and the first DR member device and a second DR member device included in the DR device are connected with a host via an aggregation port. As shown in FIG. 6, the apparatus may include: a generating module 621 configured to generate a first synchronous message carrying address information of the host and an identifier of the aggregation port according to an ARP packet received from the host; and a sending module 622 configured to send the first synchronous message to the remote device so that the remote device determines that the remote device is connected with the DR device via at least two tunnels according to the identifier of the aggregation port and respectively generates a forwarding entry corresponding to the host according to each of the tunnels.

In an example, the generating module 621 is also configured to generate a forwarding entry corresponding to the host according to the ARP packet received from the host, where the forwarding entry includes the address information of the host and the identifier of the aggregation port.

In another example, the sending module 622 is also configured to send an inter-member synchronous message to the second DR member device, where the inter-member synchronous message carries the address information of the host, the identifier of the aggregation port and a network identifier, where the network identifier includes a VXLAN identifier and/or a VLAN identifier.

The generating module 621 is also configured to analyze the address information of the host, the identifier of the aggregation port and the network identifier from an inter-member synchronous message after receiving the inter-member synchronous message from the second DR member device, and thereby generate a forwarding entry, where the forwarding entry includes the address information of the host, the identifier of the aggregation port and the network identifier. The network identifier includes a VXLAN identifier and/or a VLAN identifier.

Figure 7:
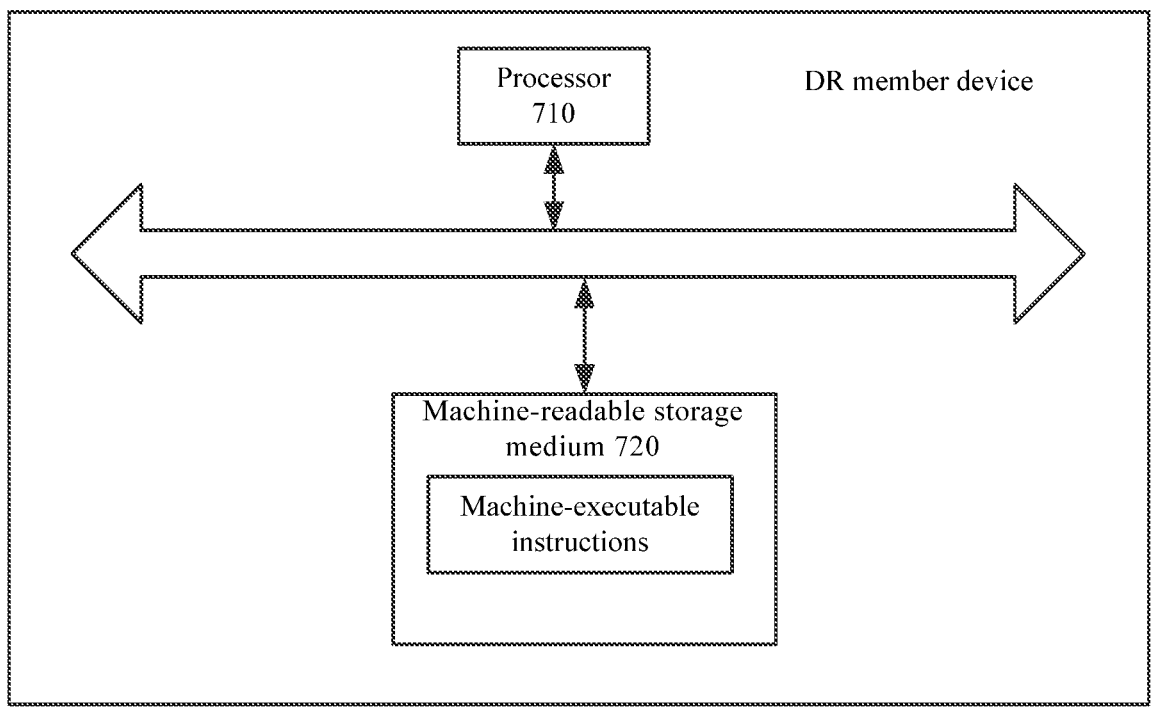
FIG. 7 is a schematic diagram illustrating a hardware structure of a Distributed Resilient Network Interconnect (DR) member device according to an example of the present disclosure.

Based on a hardware level, FIG. 7 illustrates a hardware structure of a DR member device according to an example of the present disclosure. The hardware structure may include a machine-readable storage medium 720 and a processor 710. The machine-readable storage medium 720 stores machine-executable instructions. The processor 710 communicates with the machine-readable storage medium 720 so that the processor 710 may execute the operations of generating a forwarding entry as above by reading and executing the machine-executable instructions stored in the machine-readable storage medium 720.

Here, the machine-readable storage medium may be any of electronic, magnetic, optical or other physical storage devices that can contain or store information such as executable instructions, data, and the like. For example, the machine-readable storage medium may be a volatile memory, a nonvolatile memory or a similar storage medium. Specifically, the machine-readable storage medium may be a Random Access Memory (RAM), a flash memory, a storage drive (e.g. hard disk drive), a solid state hard disk, any type of storage disk (e.g., optical disk, DVD, and the like), or a combination thereof.

Based on a same idea as the foregoing method, the present disclosure also provides a machine-readable storage medium, which may be applied to a remote device. A DR device connected with the remote device includes a first DR member device and a second DR member device. The first DR member device and the second DR member device are connected with a host via an aggregation port. The machine-readable storage medium stores a plurality of machine-executable instructions. When the machine-executable instructions are executed, the following operations may be performed: receiving a first synchronous message carrying address information of the host from the first DR member device; determining that the remote device is connected with the DR device via at least two tunnels according to an identifier of the aggregation port if the first synchronous message carries the identifier of the aggregation port; and generating a forwarding entry corresponding to the host according to each of the tunnels, where each of the forwarding entries includes the address information of the host, the identifier of the aggregation port and information of the tunnel.

Based on a same idea as the foregoing method, the present disclosure also provides a machine-readable storage medium, which may be applied to a first DR member device in a DR device. The DR device is connected with a remote device, and a first DR member device and a second DR member device included in the DR device are connected with a host via an aggregation port. The machine-readable storage medium stores a plurality of machine-executable instructions. When the machine-executable instructions are executed, the following operations may be performed: generating a first synchronous message carrying address information of the host and an identifier of the aggregation port according to an ARP packet received from the host; and sending the first synchronous message to the remote device so that the remote device determines that the remote device is connected with the DR device via at least two tunnels according to the identifier of the aggregation port and respectively generates a forwarding entry corresponding to the host according to each of the tunnels.

For convenience of description, the foregoing apparatus is described by dividing the apparatus into different units based on functions. Of course, the functions of the different units may be achieved in one or more pieces of software and/or hardware when the present disclosure is implemented.

It is to be understood by those skilled in the art that examples of the present disclosure may be provided as a method, a system or a computer program product. Thus, the present disclosure may be implemented in the form of software or hardware or a combination thereof. Moreover, examples of the present disclosure may also be implemented by a computer program product operated on one or more computer-usable storage mediums (including not limited to magnetic disk storage, CD-ROM, optical memory) containing computer-usable program codes.

The present disclosure is described with reference to flowcharts and/or block diagrams of a method, a device (a system) and a computer program product in an example of the present disclosure. It should be appreciated that each flow and/or block in the flowcharts and/or block diagrams and a combination of the flows and/or blocks in the flowcharts and/or block diagrams may be realized by a computer program instruction. These computer program instructions may be provided to a universal computer, a dedicated computer, an embedded processor or a processor of another programmable data processing device to produce a machine so that an apparatus for realizing a function specified in one or more flows in the flowcharts and/or one or more blocks in the block diagrams is produced by instructions executed by a computer or a processor of another programmable data processing device.

Moreover, these computer program instructions may also be stored on a computer-readable memory capable of instructing a computer or another programmable data processing device to work in a specific manner so that the instructions stored on the computer-readable memory produce a product including an instruction apparatus which realizes a function specified in one or more flows in the flowcharts and/or one or more blocks in the block diagrams.

These computer program instructions may also be loaded to a computer or another programmable data processing device to implement a series of operation blocks on the computer or the another programmable data processing device so as to generate procedures realized by the computer so that the instructions executed on the computer or the another programmable data processing device are provided to achieve a step for realizing a function specified in one or more flows in the flowcharts and/or one or more blocks in the block diagrams.

The foregoing disclosure is merely illustrative of examples of the present disclosure but not intended to limit the present disclosure. Various modifications and variations may be made by those skilled in the art. Any modifications, equivalent substitutions, adaptations thereof made within the spirit and principles of the present disclosure shall be encompassed in the scope of protection of the appended claims of the present disclosure.

The invention claimed is:

1. A method of generating a forwarding entry, comprising:
receiving, by a remote device, a first synchronous message carrying address information of a host from a first Distributed Resilient Network Interconnect (DR) member device in a DR device, wherein the remote device is connected with the DR device, the DR device further comprises at least one second DR member device, and the first DR member device and the second DR member device are both connected with the host via an aggregation port;
when the first synchronous message carries an identifier of the aggregation port,
determining, by the remote device, that the remote device is connected with the first DR member device in the DR device via a first tunnel and connected with the second DR member device in the DR device via a second tunnel according to the identifier of the aggregation port;
generating, by the remote device, a first forwarding entry corresponding to the host according to the first tunnel, wherein the first forwarding entry comprises the address information of the host, the identifier of the aggregation port and information of the first tunnel; and
generating, by the remote device, a second forwarding entry corresponding to the host according to the second tunnel, wherein the second forwarding entry comprises the address information of the host, the identifier of the aggregation port and information of the second tunnel.

2. The method according to claim 1, wherein generating the first forwarding entry corresponding to the host according to the first tunnel comprises:
determining, by the remote device, whether the first forwarding entry corresponding to the host is present in a forwarding table; and
adding, by the remote device, the first forwarding entry to the forwarding table when the first forwarding entry corresponding to the host is not present in the forwarding table, wherein the first forwarding entry records a corresponding relationship among the first tunnel, the address information of the host and the identifier of the aggregation port.

3. The method according to claim 1, wherein generating the second forwarding entry corresponding to the host according to the second tunnel comprises:
determining, by the remote device, whether the second forwarding entry corresponding to the host is present in a forwarding table; and
adding the second forwarding entry to the forwarding table when the second forwarding entry corresponding to the host is not present in the forwarding table, wherein the second forwarding entry records a corresponding relationship among the second tunnel, the address information of the host and the identifier of the aggregation port.

4. The method according to claim 1, further comprising:
when the first synchronous message carries no identifier of the aggregation port,
obtaining, by the remote device, a shared tunnel between the remote device and the DR device, wherein an address of one end of the shared tunnel is an aggregation address of the DR device; and
generating, by the remote device, a shared forwarding entry corresponding to the host, wherein the shared forwarding entry comprises the address information of the host and information of the shared tunnel.

5. An apparatus for generating a forwarding entry, the apparatus being applied to a remote device, comprising:
a non-transitory machine-readable storage medium storing machine-executable instructions; and
a processor configured to execute the machine-executable instructions to implement the method of claim 1.

6. A non-transitory machine-readable storage medium applied to a remote device, wherein the machine-readable storage medium stores a plurality of machine-executable instructions which are executed to implement the method of claim 1.

7. A method of generating a forwarding entry, comprising:
generating, by a first Distributed Resilient Network Interconnect (DR) member device in a DR device, a first synchronous message carrying address information of a host and an identifier of an aggregation port according to an Address Resolution Protocol (ARP) packet received from the host, wherein the DR device further comprises at least one second DR member device, and the first DR member device and the second DR member device are connected with the host via the aggregation port; and sending, by the first DR member device, the first synchronous message to a remote device, which is connected with the first DR member device via a first tunnel and connected with the second DR member device via a second tunnel according to the identifier of the aggregation port, the first synchronous message is used by the remote device for generating a first forwarding entry corresponding to the host according to the first tunnel, wherein the first forwarding entry comprises the address information of the host, the identifier of the aggregation port and information of the first tunnel.

8. The method according to claim 7, further comprising:
generating, by the first DR member device, a third forwarding entry corresponding to the host according to the ARP packet, wherein the third forwarding entry comprises the address information of the host and the identifier of the aggregation port.

9. The method according to claim 7, further comprising:
sending, by the first DR member device, a first inter-member synchronous message to the second DR member device according to the ARP packet,
wherein the first inter-member synchronous message carries the address information of the host, the identifier of the aggregation port and a network identifier, and the network identifier comprises at least one of a Virtual eXtensible Local Area Network (VXLAN) identifier and a Virtual Local Area Network (VLAN) identifier.

10. The method according to claim 7, further comprising:
analyzing, by the first DR member device, the address information of the host, the identifier of the aggregation port and a network identifier from a second inter-member synchronous message after the first DR member device receives the second inter-member synchronous message from the second DR member device, wherein the network identifier comprises at least one of a Virtual eXtensible Local Area Network (VXLAN) identifier and a Virtual Local Area Network (VLAN) identifier; and generating, by the first DR member device, a fourth forwarding entry, wherein the fourth forwarding entry comprises the address information of the host, the identifier of the aggregation port and the network identifier.

11. An apparatus for generating a forwarding entry, the apparatus being applied to a first Distributed Resilient Network Interconnect (DR) member device in a DR device, comprising:
a non-transitory machine-readable storage medium storing machine-executable instructions; and
a processor configured to execute the machine-executable instructions to implement the method of claim 7.

12. A non-transitory machine-readable storage medium applied to a first Distributed Resilient Network Interconnect (DR) member device in a DR device, wherein the machine-readable storage medium stores a plurality of machine-executable instructions which are executed to implement the method of claim 7.

* * * * *